United States Patent
Ko et al.

(10) Patent No.: US 11,680,637 B2
(45) Date of Patent: *Jun. 20, 2023

(54) ELECTRONIC SHIFT LEVER

(71) Applicant: HYUNDAI KEFICO CORPORATION, Gunpo-si (KR)

(72) Inventors: Jae Yu Ko, Seoul (KR); Ji Hwan Oh, Seoul (KR); Su Won Kim, Gyeonggi-do (KR); Chan Woo Lee, Gyeonggi-do (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 272 days.

This patent is subject to a terminal disclaimer.

(21) Appl. No.: 17/034,330

(22) Filed: Sep. 28, 2020

(65) Prior Publication Data

US 2021/0131555 A1 May 6, 2021

(30) Foreign Application Priority Data

Oct. 30, 2019 (KR) .................. 10-2019-0136118

(51) Int. Cl.
| | |
|---|---|
| *F16H 1/32* | (2006.01) |
| *F16H 59/08* | (2006.01) |
| *F16H 59/10* | (2006.01) |
| *B60K 23/00* | (2006.01) |
| *F16C 19/18* | (2006.01) |
| *G01D 5/14* | (2006.01) |
| *G01B 7/30* | (2006.01) |

(52) U.S. Cl.
CPC ........... *F16H 59/105* (2013.01); *B60K 23/00* (2013.01); *F16C 19/183* (2013.01); *F16H 1/32* (2013.01); *G01B 7/30* (2013.01); *G01D 5/145* (2013.01); *F16H 2059/081* (2013.01)

(58) Field of Classification Search
CPC .......... F16H 59/105; F16H 1/32; F16H 59/08; F16H 2059/081; G01B 7/30; G01D 5/145; B60K 23/00; F16C 19/183
See application file for complete search history.

(56) References Cited

U.S. PATENT DOCUMENTS

| 11,391,369 | B2 * | 7/2022 | Min | H02K 11/215 |
| 2009/0078066 | A1 * | 3/2009 | Schuler | B60N 2/2252 |
| | | | | 74/25 |
| 2011/0126657 | A1 * | 6/2011 | Ganter | F16H 61/12 |
| | | | | 74/473.12 |

(Continued)

FOREIGN PATENT DOCUMENTS

| JP | 2007040367 A | 2/2007 |
| KR | 1020130009179 A | 1/2013 |

(Continued)

*Primary Examiner* — Joseph Brown
*Assistant Examiner* — Gregory T Prather
(74) *Attorney, Agent, or Firm* — Fox Rothschild LLP

(57) ABSTRACT

An electronic shift lever is provided and includes a housing which accommodates various components therein. A motor unit generates a driving force and a reduction unit is connected to the motor unit. The reduction unit is configured to increase the driving force generated from the motor unit. The motor unit and the reduction unit are accommodated inside the housing and are formed integrally with each other.

9 Claims, 5 Drawing Sheets

(56) References Cited

U.S. PATENT DOCUMENTS

| | | | |
|---|---|---|---|
| 2015/0027861 A1* | 1/2015 | Hoskins | H01H 19/16 |
| | | | 200/43.11 |
| 2018/0320780 A1* | 11/2018 | Heo | F16H 59/02 |
| 2019/0049002 A1* | 2/2019 | Wang | F16H 61/22 |
| 2019/0203832 A1* | 7/2019 | Heo | F16H 61/24 |
| 2019/0326842 A1* | 10/2019 | Omekanda | H02K 7/20 |
| 2019/0356257 A1* | 11/2019 | Gopalakrishnan | |
| | | | H02P 25/0805 |
| 2021/0088127 A1* | 3/2021 | Ko | F16H 61/28 |

FOREIGN PATENT DOCUMENTS

| | | |
|---|---|---|
| KR | 1020150040655 A | 4/2015 |
| KR | 10-2017-0006535 A | 1/2017 |
| KR | 1020190082011 A | 7/2019 |
| KR | 10-2105190 B1 | 4/2020 |

* cited by examiner

ELECTRONIC SHIFT LEVER

CROSS-REFERENCE TO RELATED APPLICATION

The application claims priority to Korean Patent Application No. 10-2019-0136118 filed on Oct. 30, 2019, the entire contents of which is incorporated herein for all purposes by this reference.

BACKGROUND

1. Field of the Disclosure

The present disclosure relates to an electronic shift lever, and more particularly, to an electronic shift lever in which a gearshift in a target shift stage range may be automatically operated within a shift range set according to a driving speed of a vehicle.

2. Discussion of Related Art

In general, a vehicle equipped with an automatic transmission allows a gearshift in a target shift range to be automatically operated by adjusting hydraulic pressure within a shift range set according to a driving speed of the vehicle. To perform shifting, the automatic transmission sets up a gear ratio using a hydraulic circuit, a planetary gear, and frictional elements. A transmission control unit (TCU) operates such components.

Meanwhile, unlike an existing mechanical shift system operated through the existing mechanical mechanism, a shift-by-wire (hereinafter, referred to as "SBW") system is a shift system in which mechanism parts such as a cable, a mechanical manual valve, and a mechanical parking mechanism are removed. The SBW system is a system in which, when a lever sensor value generated during an operation of an electronic shift lever or a button is transferred to a TCU, a solenoid or an electric motor is operated by an electronic signal instructed by the TCU, and then, by the operation of the solenoid or the electric motor, oil pressure is applied to or shut off from a hydraulic circuit for each shift stage, whereby shift control may be electronically performed.

Therefore, an automatic transmission based on SBW delivers a driver's intention of shifting in the form of an electric signal to a TCU through a simple operation of an electronic shift lever or a button. Accordingly, shifting into a driving range (D), a reverse range (R), a neutral range (N), a parking range (P), and the like is easily performed. In addition, the size of the shift lever may be reduced to secure more space between a driver's seat and a passenger's seat.

An automatic transmission based on the conventional SBW includes a housing, a rotor core, a magnet yoke, and a sensor magnet. The rotor core and the magnet yoke are accommodated inside the housing, and the magnet yoke is assembled in a magnetized state on an upper portion of the rotor core. The sensor magnet is attached to the magnet yoke coupled to the upper portion of the rotor core through a bonding method. A magnetic force is delivered to a hall sensor positioned on a motor through the sensor magnet.

Meanwhile, the rotor core and the magnet yoke may be assembled in a mutually magnetized state, but for the rotor core and the magnet yoke to be assembled more firmly, a aperture may be formed in the upper portion of the rotor core to couple the magnet yoke to the aperture. Therefore, an additional operation process for forming the aperture in the upper portion of the rotor core is required. In addition, since an unnecessary space is formed inside the housing in addition to a space for installing the magnet yoke, there is a high possibility that a packaging problem occurs due to a full length of a product.

For the above-described reasons, in the related field, a method of reducing an additional operation process and a size of an automatic transmission is being sought, but until now, satisfactory results have not been obtained.

SUMMARY

The present disclosure is directed to providing an electronic shift lever which allows an additional operation process and a size of an automatic transmission to be reduced.

According to an aspect of the present disclosure, an electronic shift lever may include a housing which accommodates various components therein, a motor unit configured to generate a driving force, a reduction unit connected to the motor unit and configured to increase the driving force generated from the motor unit, and a printed circuit board (PCB) disposed on the motor unit and to which a Hall sensor is attached, wherein the motor unit and the reduction unit may be accommodated inside the housing and may be formed integrally with each other.

The motor unit may include a rotor core configured to generate the driving force, a hollow shaft rotated by the driving force of the rotor core due to the rotor core inserted to be disposed on an outer circumferential surface of the hollow shaft, a sensing plate disposed between the PCB and the reduction unit, and a sensor magnet attached to the sensing plate and sensed by the Hall sensor of the PCB, the reduction unit may include an output shaft in which the hollow shaft may be inserted to be disposed on an outer circumferential surface thereof, a bearing inserted between the hollow shaft and the output shaft, and a gear portion connected to the hollow shaft and the output shaft to deliver a driving force of the hollow shaft to the output shaft, and the sensing plate may be coupled between one end of the output shaft and one end of the hollow shaft.

The hollow shaft may include an eccentric portion formed on an outer circumferential surface in the one end direction thereof and may deliver the driving force of the rotor core to the gear portion through the eccentric portion. The gear portion may include an inner gear inserted to be disposed on the eccentric portion of the hollow shaft and an outer gear coupled to an outer circumferential surface of the inner gear, and the outer gear and the inner gear may be coupled to each other in a cycloid gear structure.

A wing or flange portion, through which a coupling groove passes, may be formed on an outer circumferential surface of the output shaft, and a coupling protrusion may be formed to extend downward from a position of a lower surface of the inner gear, which corresponds to the coupling groove, and may be inserted into the coupling groove. The sensing plate may include a plate portion which has a lower surface with which an end of the hollow shaft in one direction is in contact and has an upper surface to which the sensor magnet is attached, and an insertion portion having a cylindrical shape which extends downward from the plate portion.

An outer circumferential surface of the insertion portion may be in contact with an inner circumferential surface of the hollow shaft, and an inner circumferential surface of the insertion portion may be in contact with an outer circumferential surface of the output shaft. The bearing may include a double-row bearing disposed between an outer circumferential surface of the output shaft and an inner circumferential surface of the hollow shaft, and a single-row bearing disposed between an outer circumferential surface of the hollow shaft and an inner circumferential surface of the gear portion.

The double-row bearing may include two radial-type ball bearings which are rotatable in response to external forces in axial, radial, and tangential directions. The reduction unit may further include a reducer cover in which an outer gear is assembled in a press-fitting manner, and a knurled surface may be formed on a surface of the reducer cover on which the outer gear is press-fitted.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
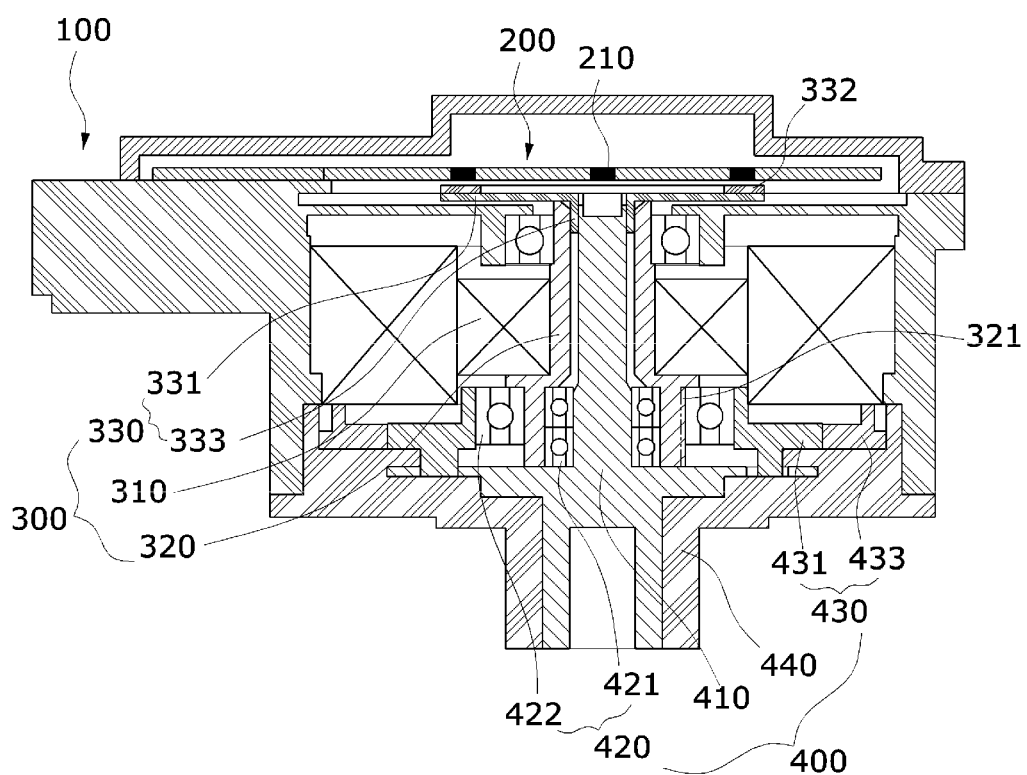
FIG. 1 is a cross-sectional view illustrating a cross section of an electronic shift lever according to one exemplary embodiment of the present disclosure.
Figure 2:
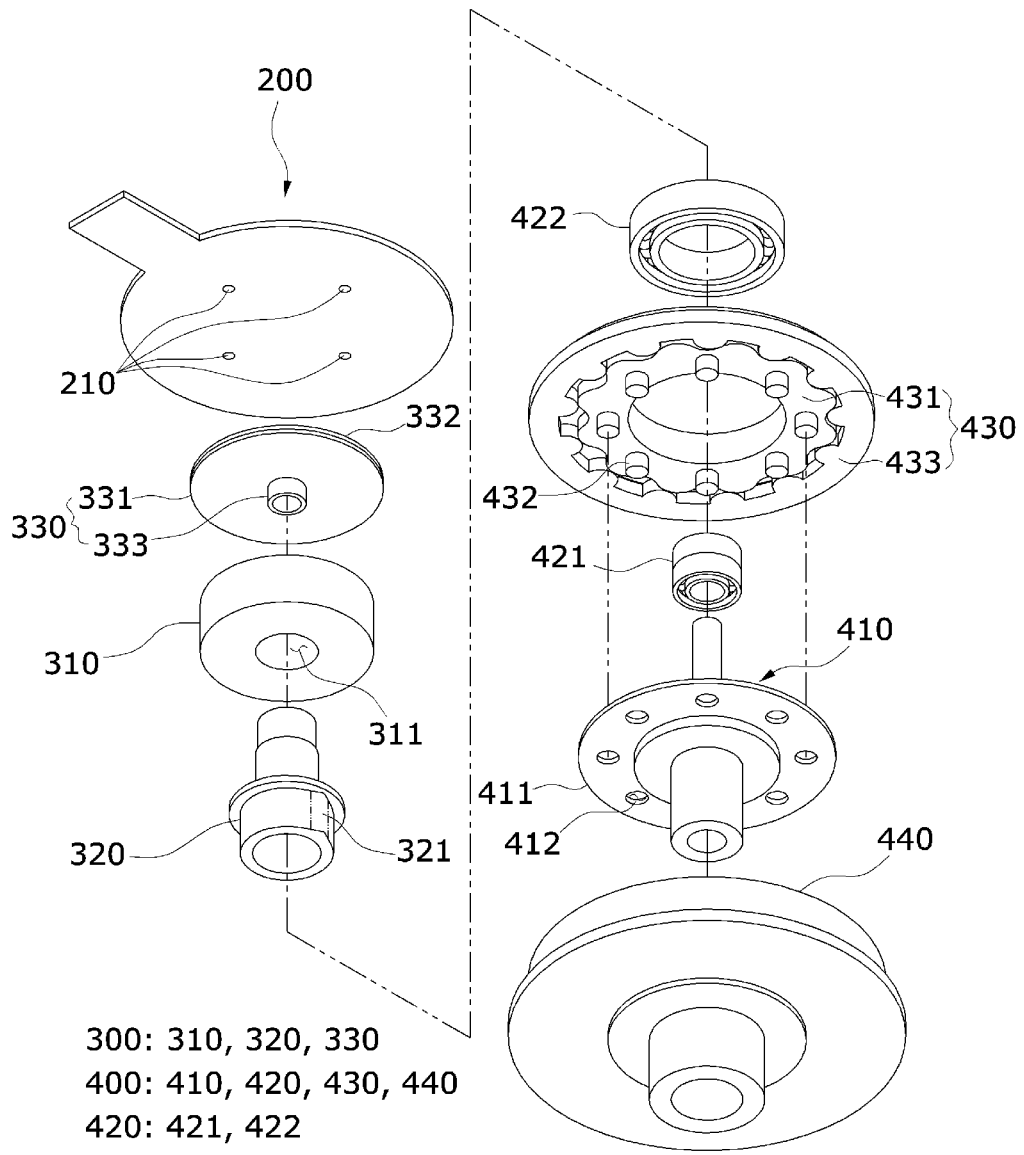
FIG. 2 is an exploded perspective view illustrating the electronic shift lever according to one exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The advantages and features of the present disclosure and methods for accomplishing the same will be more clearly understood from exemplary embodiments described below with reference to the accompanying drawings. However, the present disclosure is not limited to the following exemplary embodiments but may be implemented in various different forms.

Rather, the present exemplary embodiments will make the disclosure of the present disclosure complete and allow those skilled in the art to completely comprehend the scope of the present disclosure. The present disclosure is only defined within the scope of accompanying claims.

Terms used in this specification are to describe the embodiments and are not intended to limit the present disclosure. As used herein, singular expressions, unless defined otherwise in contexts, include plural expressions. It will be further understood that the terms "comprises," "comprising," "includes," and/or "including," when used herein, specify the presence of stated components, steps, operations, and/or elements, but do not preclude the presence or addition of one or more other components, steps, operations, and/or elements.

Hereinafter, exemplary embodiments of the present disclosure will be described in detail with reference to the accompanying drawings.

Referring to FIGS. 1 to 5, the electronic shift lever according to one exemplary embodiment of the present disclosure may include a housing 100, a printed circuit board (PCB) 200, a motor unit 300, and a reduction unit 400. The housing 100 accommodates various components such as the PCB 200, the motor unit 300, and the reduction unit 400 and blocks foreign materials from being introduced from the outside.

The housing 100 protects various components accommodated therein from an external impact. The PCB 200 is disposed in one end direction inside the housing 100, and at least one Hall sensor 210 is disposed therein. The Hall sensor 210 attached to the PCB 200 may be configured to sense a change in magnetic flux of a sensor magnet 332 of the motor unit 300 to calculate a rotation angle of the motor unit 300.

Meanwhile, when the Hall sensor 210 attached to the PCB 200 is able to sense the change in magnetic flux of the sensor magnet 332, the Hall sensor 210 may also include various sensors. The motor unit 300 may be accommodated inside the housing 100, and a driving force thereof may be generated according to an input signal of a controller configured to receive an input signal from a user. The motor unit 300 may include a rotor core 310, a hollow shaft 320, a sensing plate 330, and the sensor magnet 332. The rotor core 310 may be configured to generate the driving force in the motor unit 300 and has an aperture 311 formed to pass through a first end and a second end thereof. The hollow shaft 320 passes through the aperture 311.

Meanwhile, the rotor core 310 according to one exemplary embodiment of the present disclosure may be a brushless direct current (BLDC) motor or a switched reluctance (SR) motor. The rotor core 310 may be inserted to be disposed on an outer circumferential surface of the hollow shaft 320, and thus, the hollow shaft 320 may be rotated by the driving force of the rotor core 310. The first end and the second end of an inside of the hollow shaft 320 communicate with each other.

An eccentric portion 321 may be formed in the hollow shaft 320. The eccentric portion 321 may be formed on the outer circumferential surface in the second end direction of the hollow shaft 320 and allows the driving force of the rotor core 310 to be delivered to a gear portion 430. The eccentric portion 321 protrudes from the outer circumferential surface in the second end direction of the hollow shaft 320, and when the hollow shaft 320 may be rotated by the rotation of the rotor core 310, the eccentric portion 321 presses the gear portion 430.

The sensing plate 330 may be disposed under the PCB 200 and may be disposed at a first end of the hollow shaft 320. In other words, the sensing plate 330 may be disposed between the PCB 200 and the hollow shaft 320. The sensing plate 330 may be coupled between one end (e.g., a first end) of the hollow shaft 320 and one end (e.g., a first end) of an output shaft 410 of the reduction unit 400. The sensing plate 330 may include a plate portion 331 and an insertion portion 333.

One end of the hollow shaft 320 is in contact with a lower surface of the plate portion 331, and the sensor magnet 332, of which a magnetic force is sensed by the Hall sensor 210 attached to the PCB 200, may be attached onto an upper surface of the plate portion 331. The plate portion 331 may be formed to be thick, may have an outer diameter greater than an outer diameter of the hollow shaft 320, and may have an area smaller than an area of the PCB 200. In particular, the plate portion 331 may be disposed adjacent to the PCB 200.

The Hall sensor 210 attached to the PCB 200 may be disposed in a region that overlaps the plate portion 331. Thus, the Hall sensor 210 may be configured to sense the change in magnetic flux of the sensor magnet 332 attached to the plate portion 331 to calculate the rotation angle of the motor unit 300. In addition, the plate portion 331 and the PCB 200 may be disposed adjacent to each other, and thus, the Hall sensor 210 attached to the PCB 200 may have a relatively high detection power with respect to the sensor magnet 332 to accurately sense the sensor magnet 332. In addition, the sensor magnet 332 having low magnetism may be selectively used according to a use environment to lower costs of the sensor magnet 332.

Figure 3:
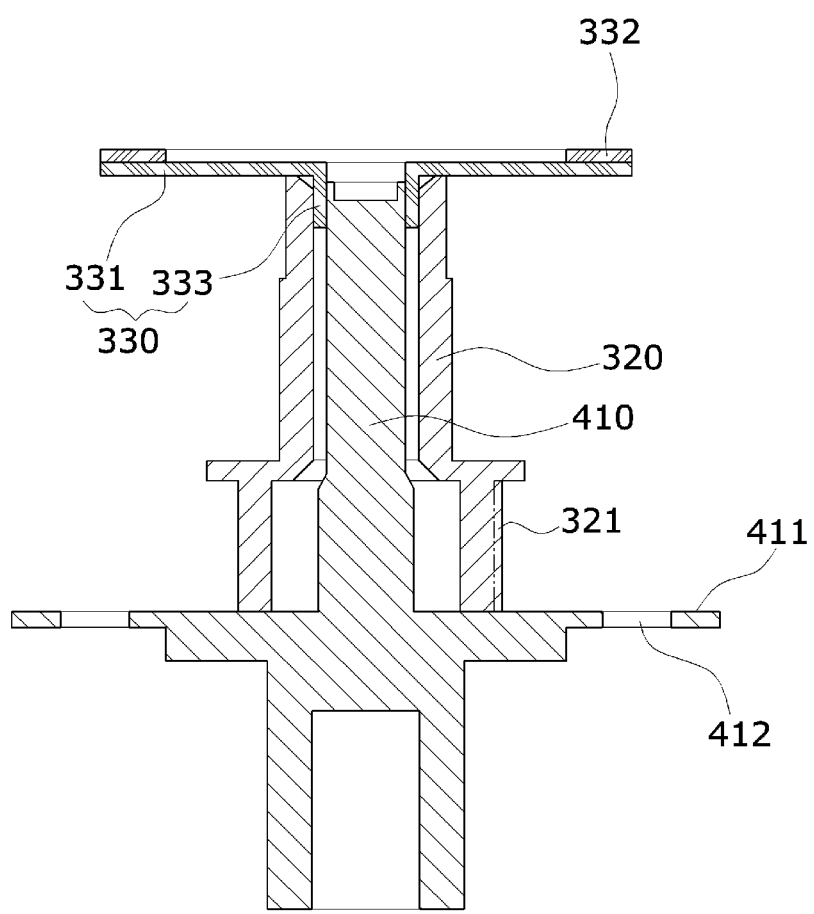
FIG. 3 is a cross-sectional view illustrating a coupling structure of a sensing plate of the electronic shift lever according to one exemplary embodiment of the present disclosure.

Furthermore, since the plate portion 331 may be formed to be thick, the housing 100 may be formed to have a small size, thereby making the electronic shift lever compact. The insertion portion 333 may be formed to have a cylindrical shape and extend downward from the lower surface of the plate portion 331. The insertion portion 333 may have a cross-sectional shape that corresponds to cross-sectional shapes of the hollow shaft 320 and the output shaft 410 of the reduction unit 400. As shown in FIG. 3, the insertion portion 333 may be inserted between the hollow shaft 320 and the output shaft 410. Thus, the insertion portion 333 prevents the sensing plate 330 from being separated from the hollow shaft 320 and the output shaft 410.

The reduction unit 400 may be connected to the motor unit 300 to increase the driving force generated from the motor unit 300, specifically, the rotor core 310, and may include the output shaft 410, a bearing, and the gear portion 430. The hollow shaft 320 may be inserted to be disposed on an outer circumferential surface of the output shaft 410, and a lower portion of the output shaft 410 may be connected to a detent lever (not shown) which changes parking (P), reverse (R), neutral (N), and driving (D) stages of a transmission according to an input signal of the controller.

In other words, when the driving force generated in the rotor core 310 may be delivered to the output shaft 410 through the gear portion 430 according to the rotation of the hollow shaft 320, the output shaft 410 may be rotated to deliver the driving force of the rotor core 310 to the detent lever. Therefore, the output shaft 410 may be configured to rotate the detent lever by a specific position according to the driving force to change the P, R, N, and D stages of the transmission.

In addition, the output shaft 410 may have an outer diameter that is less than an inner diameter of the hollow shaft 320. Accordingly, the outer circumferential surface of the output shaft 410 may be spaced apart from an inner circumferential surface of the hollow shaft 320 by a certain distance, and as shown in FIG. 3, the insertion portion 333 may be fitted between one end direction (e.g., a first end direction) of the output shaft 410 and one end direction (e.g., a first end direction) of the hollow shaft 320 in a forcible fitting manner.

In other words, an inner circumferential surface of the insertion portion 333 is in contact with the outer circumferential surface of the output shaft 410, and an outer circumferential surface thereof is in contact with the inner circumferential surface of the hollow shaft 320. Due to such a coupling structure, the sensing plate 330 may be stably prevented from being separated from the hollow shaft 320 and the output shaft 410 by a vibration of the rotor core 310 or an external force applied from the outside.

The bearing may be inserted between the hollow shaft 320 and the output shaft 410. When the gear portion 430 is rotated by the driving force of the rotor core 310, the bearing allows the gear portion 430 to be rotated more easily from the housing 100. In particular, due to the bearing, the gear portion 430 allows the hollow shaft 320 and the output shaft 410 to be strongly supported by the housing 100.

Additionally, the bearing may include a double-row bearing 421 and a single-row bearing 422. The double-row bearing 421 may be disposed between the outer circumferential surface of the output shaft 410 and the inner circumferential surface of the hollow shaft 320 and supports both of the hollow shaft 320 and the output shaft 410. Thus, when the rotor core 310 is operated, the double-row bearing 421 minimizes the shaking of the hollow shaft 320 and the output shaft 410, thereby securing robustness of the hollow shaft 320 and the output shaft 410.

The double-row bearing 421 may include two radial-type ball bearings which are rotatable in response to external forces in axial, radial, and tangential directions. The single-row bearing 422 may be disposed between an outer circumferential surface of the hollow shaft 320 and an inner circumferential surface of the gear portion 430 and supports the hollow shaft 320 and the gear portion 430 together. Thus, when the rotor core 310 is operated, the single-row bearing 422 minimizes the shaking of the hollow shaft 320 and the gear portion 430, thereby securing robustness of the hollow shaft 320 and the gear portion 430.

The gear portion 430 may be connected to the hollow shaft 320 and the output shaft 410 to deliver the driving force of the rotor core 310 to the output shaft 410 and may be selectively rotated by the driving force of the rotor core 310, which is generated according to an input signal of the controller. The gear portion 430 may include an inner gear 431 and an outer gear 433. The inner gear 431 may be inserted to be disposed in a region of the eccentric portion 321 of the hollow shaft 320 and may be rotated concurrently when the hollow shaft 320 is rotated by the driving force of the rotor core 310.

The outer gear 433 may be disposed on an outer circumferential surface of the inner gear 431 to be coupled to the inner gear 431 and may be rotated together with the inner gear 431 when the hollow shaft 320 is rotated by the driving force of the rotor core 310. The inner gear 431 and the outer gear 433 may receive the driving force from the rotor core 310 and perform deceleration to increase the driving force. An amount of increase in the driving force may be determined according to a deceleration ratio set by parameters such as a module, a pitch circle diameter (PCD), and the number of teeth of the inner gear 431 and the outer gear 433.

Figure 4:
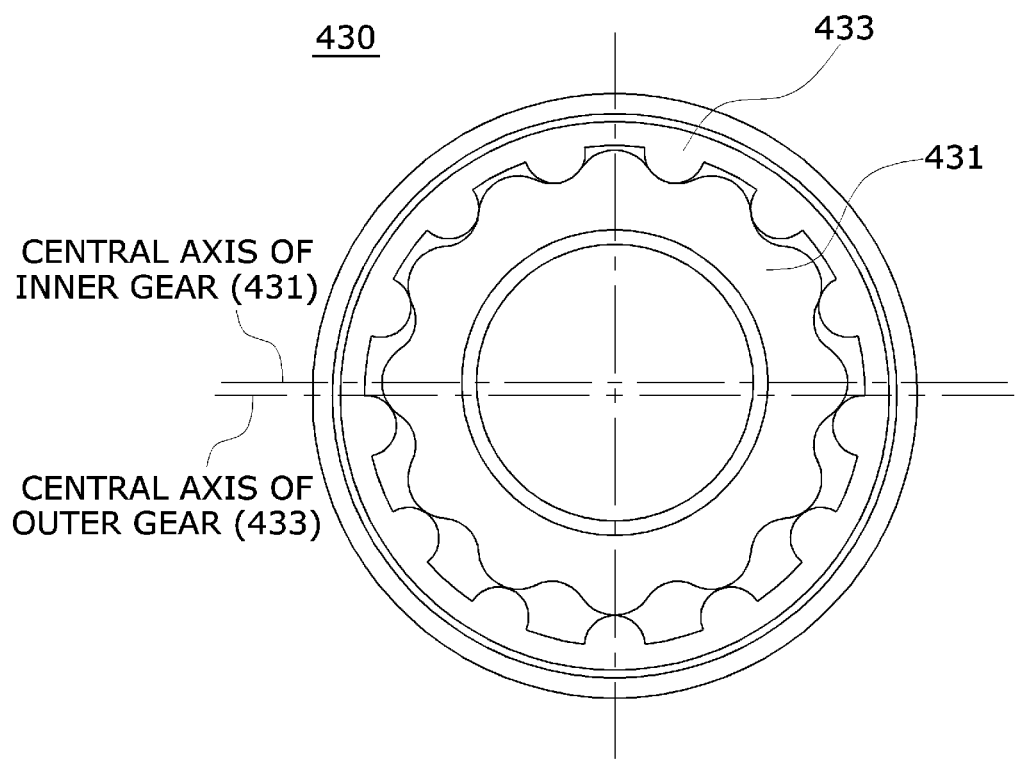
FIG. 4 is a plan view illustrating a gear portion of the electronic shift lever according to one exemplary embodiment of the present disclosure.

Meanwhile, the inner gear 431 and the outer gear 433 may be coupled to each other in a cycloid gear structure. Accordingly, as shown in FIG. 4, the inner gear 431 may be eccentrically assembled with the outer gear 433, and a driving force may be delivered to the output shaft 410 according to eccentricity. Meanwhile, a wing portion, in which a plurality of coupling grooves 412 are formed at equal intervals in a circumferential direction thereof, may be formed on the outer circumferential surface of the output shaft 410.

Coupling protrusions 432 extend downward from positions of a lower surface of the inner gear 431 that correspond to the coupling grooves 412. The coupling protrusions 432 may be inserted into the coupling grooves 412. Thus, when the driving force generated in the rotor core 310 is delivered to the inner gear 431 through the hollow shaft 320, the output shaft 410 may be rotated more easily according to the driving force of the hollow shaft 320 due to the coupling protrusion 432 inserted into the coupling groove 412 of the inner gear 431.

Meanwhile, among the inner gear 431 and the outer gear 433, the inner gear 431 may be rotated together with the output shaft 410 by rotation of the hollow shaft 320, but the outer gear 433 should be fixed. Accordingly, the present disclosure may further include a reducer cover 440. The reducer cover 440 supports the outer gear 433, and the outer gear 433 may be assembled in a press-fitting manner.

Figure 5:
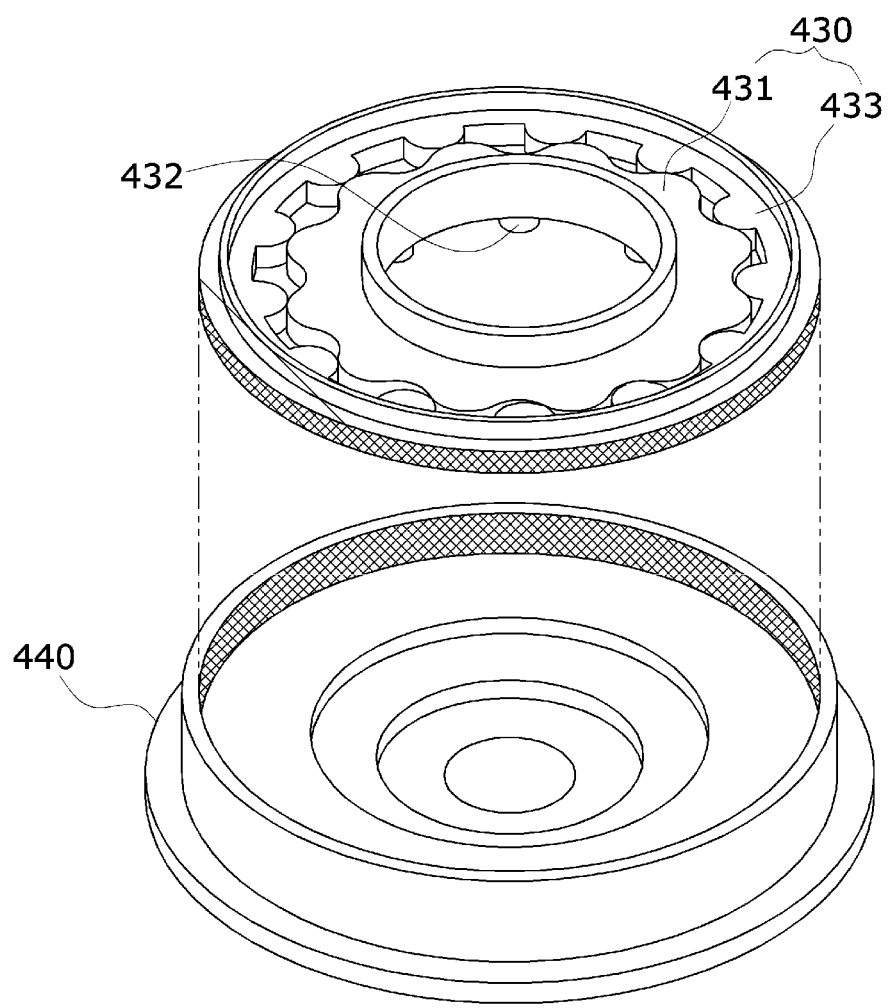
FIG. 5 is an exploded perspective view illustrating the gear portion and a reducer cover of the electronic shift lever according to one exemplary embodiment of the present disclosure.

In particular, as shown in FIG. 5, a knurled surface may be formed on a surface of the reducer cover 440, on which the outer gear 433 is press-fitted. In other words, when the outer gear 433 is assembled in the press-fitting manner, the reducer cover 440 may secure assembly robustness by a frictional force of the knurled surface, whereby the outer gear 433 may be stably fixed to the reducer cover 440. The knurled surface may be formed on the surface of the reducer cover 440, but when assembly robustness of a reduction gear and the outer gear 433 may be secured, according to a use environment or a processing method, the knurled surface may also be formed on the outer circumferential surface of the outer gear 433 and may also be formed in any one of the reducer cover 440 or the outer gear 433.

As described above, in the electronic shift lever according to the present disclosure, the plate portion 331 and the PCB 200 may be disposed adjacent to each other, and thus, the Hall sensor 210 attached to the PCB 200 may have a relatively high detection power with respect to the sensor magnet 332 to more accurately sense the sensor magnet 332. In addition, the sensor magnet 332 having low magnetism may be selectively used according to a use environment to reduce costs of the sensor magnet 332. Since the plate portion 331 may be formed to be thin, the housing 100 may be formed to have a reduced size, thereby making the electronic shift lever compact.

The present disclosure is not limited to the above-described exemplary embodiments and various modifications may be made without departing from the spirit and scope of the present disclosure.

What is claimed is:

1. An electronic shift lever, comprising:
    a housing which accommodates various components therein;
    a motor unit configured to generate a driving force;
    a reduction unit connected to the motor unit and configured to increase the driving force generated from the motor unit; and
    a printed circuit board (PCB) disposed on the motor unit and to which a Hall sensor is attached,
    wherein the motor unit and the reduction unit are accommodated inside the housing and are formed integrally with each other,
    wherein the motor unit comprises:
    (i) a rotor core configured to generate the driving force;
    (ii) a hollow shaft, wherein the hollow shaft is inserted into the rotor core such that the rotor core is disposed on an outer circumferential surface of the hollow shaft;
    (iii) a sensing plate disposed between the PCB and the reduction unit; and
    (iv) a sensor magnet attached to the sensing plate and sensed by the Hall sensor of the PCB,
    wherein the reduction unit includes an output shaft inserted into the hollow shaft such that the hollow shaft in disposed on an outer circumferential surface of the output shaft, a bearing inserted between the hollow shaft and the output shaft, and a gear portion connected to the hollow shaft and the output shaft to deliver a driving force of the hollow shaft to the output shaft, and
    wherein the sensing plate is coupled between one end of the output shaft and one end of the hollow shaft.

2. The electronic shift lever of claim 1, wherein the hollow shaft includes an eccentric portion formed on an outer circumferential surface in a first end direction and delivers the driving force of the rotor core to the gear portion through the eccentric portion.

3. The electronic shift lever of claim 2, wherein the gear portion includes an inner gear, wherein the hollow shaft is inserted into the inner gear such that the inner gear is disposed on the eccentric portion of the hollow shaft and an outer gear coupled to an outer circumferential surface of the inner gear, and the outer gear and the inner gear are coupled to each other in a cycloid gear structure.

4. The electronic shift lever of claim 3, wherein a flange portion, through which a coupling groove passes, is formed on the outer circumferential surface of the output shaft, and a coupling protrusion is formed to extend downward from a position of a lower surface of the inner gear, which corresponds to the coupling groove, and is inserted into the coupling groove.

5. The electronic shift lever of claim 1, wherein the sensing plate includes:
    a plate portion which has a lower surface with which an end of the hollow shaft in one direction is in contact and has an upper surface to which the sensor magnet is attached; and
    an insertion portion having a cylindrical shape which extends downward from the plate portion.

6. The electronic shift lever of claim 5, wherein an outer circumferential surface of the insertion portion is in contact with an inner circumferential surface of the hollow shaft, and an inner circumferential surface of the insertion portion is in contact with the outer circumferential surface of the output shaft.

7. The electronic shift lever of claim 1, wherein the bearing includes:
- a double-row bearing disposed between the outer circumferential surface of the output shaft and an inner circumferential surface of the hollow shaft; and
- a single-row bearing disposed between the outer circumferential surface of the hollow shaft and an inner circumferential surface of the gear portion.

8. The electronic shift lever of claim 7, wherein the double-row bearing includes two radial-type ball bearings which are rotatable in response to external forces in axial, radial, and tangential directions.

9. The electronic shift lever of claim 1, wherein the reduction unit further includes:
- a reducer cover in which an outer gear is assembled in a press-fitting manner; and a knurled surface formed on a surface of the reducer cover on which the outer gear is press-fitted.

\* \* \* \* \*